US012367990B2

(12) United States Patent
Li et al.

(10) Patent No.: US 12,367,990 B2
(45) Date of Patent: Jul. 22, 2025

(54) METHOD OF PRODUCING A VAPOR-PERMEABLE AND LIQUID-IMPERMEABLE POROUS STRUCTURE ELECTRODE

(71) Applicant: TAIWAN CARBON NANO TECHNOLOGY CORPORATION, Zhubei (TW)

(72) Inventors: Chia-Hung Li, Zhubei (TW);
Kuang-Che Lee, Zhubei (TW);
Chien-Yao Huang, Zhubei (TW);
Chun-Hsien Tsai, Zhubei (TW);
Ting-Chuan Lee, Zhubei (TW);
Chun-Jung Tsai, Zhubei (TW)

(73) Assignee: TAIWAN CARBON NANO TECHNOLOGY CORPORATION, Zhubei (TW)

( * ) Notice: Subject to any disclaimer, the term of this patent is extended or adjusted under 35 U.S.C. 154(b) by 82 days.

(21) Appl. No.: 18/352,117

(22) Filed: Jul. 13, 2023

(65) Prior Publication Data

US 2024/0029917 A1 Jan. 25, 2024

(30) Foreign Application Priority Data

Jul. 14, 2022 (TW) ................... 111126470

(51) Int. Cl.
*H01M 4/88* (2006.01)
*H01B 1/24* (2006.01)
(Continued)

(52) U.S. Cl.
CPC ........... *H01B 1/24* (2013.01); *H01B 13/0016* (2013.01); *H01M 4/8605* (2013.01); *H01M 4/8882* (2013.01); *H01M 4/926* (2013.01)

(58) Field of Classification Search
CPC ....... H01B 1/24; H01B 13/0016; H01M 4/26; H01M 4/92; H01M 4/8882; H01M 4/926; G01N 27/304
(Continued)

(56) References Cited

U.S. PATENT DOCUMENTS 9,871,255 B2   1/2018   Swiegers et al.
9,972,876 B2   5/2018   Park et al.
(Continued)

FOREIGN PATENT DOCUMENTS

CN   113265538 A   *   8/2021   ............. C22B 26/12
JP   2019216047 A   *   12/2019
KR   20200132350 A   *   11/2020

OTHER PUBLICATIONS

Translation of CN113265538A. (Year: 2021).*
Translation of JP2019216047A. IP.com. (Year: 2019).*
Translation of KR20200132350 (Year: 2025).*

*Primary Examiner* — Tri V Nguyen
(74) *Attorney, Agent, or Firm* — Muncy, Geissler, Olds & Lowe, P.C.

(57) ABSTRACT

A method for producing a porous structure electrode with gas permeability and liquid impermeability, includes the following steps: Step 1: mixing a catalytic material having hydrophilicity, a carbon nanotube material, a material with a hydrophilic group, and a carbon black material to form a first slurry, wherein the carbon nanotube material has a specific surface area equal to or greater than the carbon black material; Step 2: mixing the first slurry with an emulsified material to form a second slurry; Step 3: obtaining a film material through a film forming process; Step 4: heating the film material to a first temperature to remove solvent in the film material; Step 5: Repeating steps 3 to 4; and Step 6: heating the film material to a second temperature to remove
(Continued)

liquid in the film material, thereby leaving pores in the film material, and allowing the film material to solidify.

8 Claims, 6 Drawing Sheets

(51) Int. Cl.
*H01B 13/00* (2006.01)
*H01M 4/86* (2006.01)
*H01M 4/92* (2006.01)

(58) Field of Classification Search
USPC ............................... 252/506; 423/449.2, 460
See application file for complete search history.

(56) References Cited

U.S. PATENT DOCUMENTS

| | | |
|---|---|---|
| 10,355,283 B2 | 7/2019 | Swiegers et al. |
| 10,637,068 B2 | 4/2020 | Swiegers et al. |
| 2009/0130504 A1 | 5/2009 | Van Burdine |
| 2020/0083541 A1 | 3/2020 | Swiegers et al. |
| 2020/0161720 A1 | 5/2020 | Swiegers et al. |
| 2021/0159509 A1* | 5/2021 | Yang .................. H01M 8/1044 |

* cited by examiner

METHOD OF PRODUCING A VAPOR-PERMEABLE AND LIQUID-IMPERMEABLE POROUS STRUCTURE ELECTRODE

FIELD OF THE INVENTION

The present disclosure relates to a manufacturing method of an electrode, and in particular to a manufacturing method of a porous structure electrode with gas permeability and liquid impermeability.

BACKGROUND OF THE INVENTION

Carbon black materials with porous structures are used in the electrochemical cells or gas sensors as a gas diffusion electrode. Related technologies can be found in U.S. Patent Appl. 20200083541A1, U.S. Patent Appl. 20200161720A1, U.S. Pat. No. 10,637,068B2, U.S. Pat. No. 9,871,255B2, U.S. Pat. No. 10,355,283B2, U.S. Pat. No. 9,972,876B2, U.S. Patent Appl. 20090130504A1 and so on.

The conductivity, gas permeability and hydrophobicity (liquid impermeability) of the electrode greatly affect the performance of the device. Therefore, it is desirable to produce a porous structure electrode with improved gas permeability and liquid impermeability as well as good conductivity.

SUMMARY OF THE INVENTION

This summary is not intended to identify critical or essential features of the disclosure provided herein, but instead merely summarizes certain features and variations thereof.

In one aspect, the present disclosure relates to a method for producing a porous structure electrode with gas permeability and liquid impermeability, comprising the following steps: Step 1: mixing a catalytic material having hydrophilicity, a carbon nanotube material, a material with a hydrophilic group, and a carbon black material to form a first slurry, and stirring the first slurry, the carbon nanotube material has a specific surface area equal to or greater than the carbon black material; Step 2: mixing the first slurry with an emulsified material to form a second slurry, and stirring the second slurry; Step 3: obtaining a film material from the second slurry through a film forming process; Step 4: heating the film material to a first temperature to remove solvent in the film material; Step 5: Repeating steps 3 to 4 at least once; and Step 6: heating the film material to a second temperature to remove liquid in the film material, thereby leaving pores in the film material, and allowing the film material to solidify, the second temperature is higher than the first temperature. A weight percentage of the catalytic material in the first slurry is in a range of 50% to 85%, a weight percentage of the carbon nanotube material in the first slurry is in a range of 0.01% to 10%, a weight percentage of the material with the hydrophilic group in the first slurry is in a range of 7% to 30%, a weight percentage of the carbon black material in the first slurry is in a range of 5% to 30%, and a weight percentage of the emulsified material in the second slurry is in a range of 2% to 20%.

Additional advantages will be set forth in part in the description which follows or may be learned by practice. The advantages will be realized and attained by means of the features particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

Figure 1:
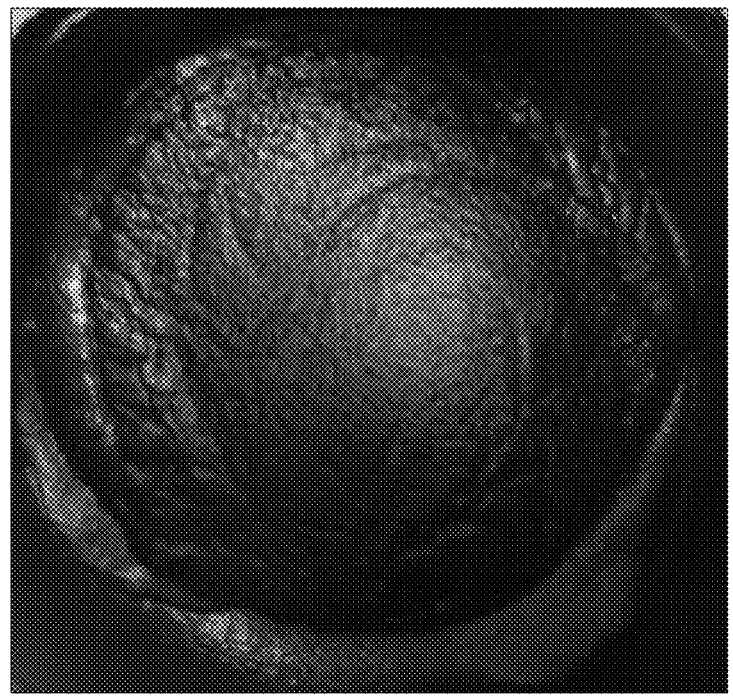
FIG. 1 shows the steady state of the first slurry from Step 1, formed by mixing a catalytic material having hydrophilicity, a carbon nanotube material, a material with a hydrophilic group, and a carbon black material.

The following explanations of terms are provided to better describe the present disclosure and to guide those of ordinary skill in the art in the practice of the present disclosure. As used herein, although steps are performed in a particular order in some embodiments, these steps still may be performed in another reasonable order. For different embodiments, some of the features described below may be substituted or eliminated. It will be appreciated that some additional operations may be performed before, during, or after the described method, and in other embodiments of the method, some operations may be replaced or omitted.

Unless otherwise indicated, all values of dimensions, quantities and physical properties used herein and in the claims are to be understood as being modified in all instances by the term "about". Therefore, unless stated otherwise, the numerical parameters listed herein and in the claims are approximate values, and those skilled in the art can make use of the content disclosed herein to seek to obtain the desired properties and appropriately change these approximate values. The use of numerical ranges by endpoints includes all numbers within that range and any ranges within that range, e.g., 1 to 5 includes 1, 1.2, 1.5, 1.7, 2, 2.75, 3, 3.80, 4, and 5, etc. value.

Unless otherwise defined, all technical and scientific terms used herein have the same meaning as commonly understood by one of ordinary skill in the art to which this invention belongs. In the specification, the singular forms also include the plural unless the context clearly dictates otherwise; as examples, the terms "a", "an", and "the" are understood to be singular or plural and the term "or" is understood to be inclusive. By way of example, "an element" means one or more element. Throughout the specification the word "comprising" or variations such as "comprises" or "includes" will be understood to imply the inclusion of a stated element, integer or step, or group of elements, integers or steps, but not the exclusion of any other element, integer or step, or group of elements, integers or steps. Unless otherwise clear from the context, all numerical values provided herein are modified by the term "about." The term "about" generally refers to a range of numbers that one of skill in the art would consider equivalent to the recited value (i.e., having the same or substantially the same function or result). In many instances, the terms "about" may include numbers that are rounded to the nearest significant figure. The recitation of numerical ranges by endpoints includes all numbers within that range (e.g., 1 to 5 includes 1, 1.1, 1.01, 1.05, 1.2, 1.08, 1.3, 1.4, 1.5, 1.6, 1.7.1.8, 1.9, 2, 2.75, 3, 3.80, 4, and 5).

The disclosure provides a method for producing a porous structure electrode with gas permeability and liquid impermeability, comprising the following steps:

Step 1: mixing a catalytic material having hydrophilicity, a carbon nanotube material, a material with a hydrophilic group, and a carbon black material to form a first slurry, and stirring the first slurry, the carbon nanotube material has a specific surface area equal to or greater than the carbon black material;

Step 2: mixing the first slurry with an emulsified material to form a second slurry, and stirring the second slurry;

Step 3: obtaining a film material from the second slurry through a film forming process;

Step 4: heating the film material to a first temperature to remove solvent in the film material;

Step 5: repeating steps 3 to 4 at least once; and

Step 6: heating the film material to a second temperature to remove liquid in the film material, thereby leaving pores in the film material, and allowing the film material to solidify, the second temperature is higher than the first temperature.

The method will be described in more detail below.

In the Step 1, the catalytic material, the carbon nanotube material, the material with the hydrophilic group and the carbon black material are mixed into the first slurry by stirring, and the mixing time is sufficient for the first slurry comes to be in a steady state. In one example, the steady state of the first slurry is as shown in the photo of FIG. 1. In an example, the mixing time is less than 10 minutes.

In terms of composition, the total weight of the first slurry is based on 100% by weight (hereinafter referred to as wt. %), and the total weight of the first slurry is sum of the weights of the catalytic material, the carbon nanotube material, the material with the hydrophilic group and the carbon black material.

In one embodiment, the weight percentage of the catalytic material in the first slurry is in a range of 50% to 85%. If the proportion of the catalytic material is too high, the slurry won't be formed into aggregates in the later steps; if the proportion of the catalytic material is too low, the electrochemical property of the electrode will be poor (low current density).

The weight percentage of the carbon nanotube material in the first slurry is in a range of 0.01% to 10%. If the proportion of the catalytic material is too high, the slurry won't be formed into an aggregate in the later steps; if the proportion of the catalytic material is too low, the electrochemical property of the electrode will be poor (low current density).

The weight percentage of the material with the hydrophilic group in the first slurry is in a range of 7% to 30%. If the proportion of the material with the hydrophilic group is too high, the demulsification reaction will be accelerated such that the material with the hydrophilic group in the aggregate cannot be fully and uniformly mixed with other compositions, and thus the aggregate is incapable of absorbing a large amount of solvent; if the proportion of the material with the hydrophilic group is too low, the material with the hydrophilic group cannot be sufficiently and uniformly mixed with other compositions such that the agglomerates will not be formed effectively.

The weight percentage of the carbon black material in the first slurry is in a range of 5% to 30%, preferably in a range of 7% to 25%, and more preferably in a range of 10% to 20%. The weight percentage of the carbon nanotube material in the first slurry is in a range of 0.01% to 10%, preferably in a range of 0.1% to 5%, and more preferably in a range of 0.2% to 4%.

The specific surface area of the carbon nanotube material is necessary to be equal to or larger than that of the carbon black material. If the specific surface area of the carbon nanotube material is less than the carbon black material, the viscosity of the first slurry viscosity will not increase and the second slurry formed afterwards will not absorb a large amount of solvent. Moreover, the retention of solvent of the film material which is processed by the film forming process is not high. In addition, the density of the porous structure electrode will be high (indicating low porosity), and the current density of the porous structure electrode will be low. In one embodiment, the specific surface area of the carbon nanotube material is in a range between 200 $m^2/g$ and 3000 $m^2/g$, preferably in a range between 300 $m^2/g$ and 3000 $m^2/g$, more preferably in a range between 750 $m^2/g$ and 3000 $m^2/g$, the specific surface area of the carbon black material is in a range between 20 $m^2/g$ and 3000 $m^2/g$, preferably in a range between 250 $m^2/g$ and 3000 $m^2/g$, more preferably in a range between 700 $m^2/g$ and 3000 $m^2/g$.

The catalytic material may be a mixture of one or more catalysts and water. The catalyst may be carbon-supported platinum (Pt/C), platinum (Pt), gold (Au), silver (Ag), iridium dioxide ($IrO_2$), ruthenium dioxide ($RuO_2$), lanthanum nickel oxide ($LaNiO_3$), lanthanum cobalt oxide ($LaCoO_3$), cobalt monoxide (CoO), tricobalt tetroxide ($Co_3O_4$), manganese dioxide ($MnO_2$), nickel hydroxide ($Ni(OH)_2$), ferric oxide ($Fe_2O_3$) or combinations thereof.

The material with the hydrophilic group may be an alcohol solvent or a ketone solvent. The alcohol solvent may be methyl alcohol, ethyl alcohol, ethylene glycol, diethylene glycol, polyethylene glycol, propylene glycol, glycerol, n-propanol, isopropyl alcohol, diacetone alcohol, n-butyl alcohol, isobutyl alcohol, pentaerythritol or combinations thereof. The ketone solvent may be acetone, methyl ethyl ketone, diisobutyl ketone, n-methylpyrrolidone, isophorone or combinations thereof.

After the first slurry forms a stable suspension, then in the Step 2, the first slurry is mixed with the emulsified material to form the second slurry. The emulsified material may be polytetrafluoroethylene emulsion, polyvinylidene fluoride emulsion, polytrifluoroethylene emulsion, fluorinated ethylene and hexafluoropropylene copolymer emulsion, perfluoroalkoxyalkane emulsion, ethylene tetrafluoroethylene emulsion, polyurethane emulsion, polypropylene emulsion, polycarbonate emulsion, polystyrene emulsion, polymethyl methacrylate emulsion, polyamide emulsion, ethylene vinyl acetate emulsion, polyvinyl acetate emulsion, polysilicone emulsion, fluoro vinyl methyl siloxane (FVMQ), styrene emulsion, polybutadiene emulsion, polyvinylchloride emulsion, styrene butadiene styrene emulsion, acrylonitrile butadiene styrene emulsion, styrene butadiene rubber emulsion or combinations thereof.

If the proportion of the emulsifying material is too high, the electrochemical property of the electrode will be poor (lower current density); if the proportion of the emulsifying material is too low, the slurry won't be formed into an aggregate in the later steps.

In addition, the viscosity of the first slurry is higher than that of the emulsified material. In one example, the viscosity of the first slurry is 18,750 cP.

After the first slurry is mixed with the emulsified material to form the second slurry, the second slurry is stirred. During stirring and mixing, the slurry undergoes two stages. In the first stage, the first slurry and the emulsified material are maintained in a steady state stage. In the steady state, the second slurry has not demulsified yet. In the first stage, the second slurry is capable of absorbing a large amount of solvent as possible. After continuous stirring, the slurry enters the second stage, and the emulsified material will be demulsified eventually in the second slurry.

In the second stage, the viscosity of the second slurry will increase significantly, and the second slurry continues to absorb solvent, which results in a volume increase of the second slurry. The amount of the solvent adsorption in the second stage may be greater than the first stage. As a result, the second slurry forms a solvent-adsorbed aggregate. When the second slurry is in the steady state (the first stage) and the subsequent demulsification state (the second stage) during stirring, the particles of the first slurry will sufficiently and homogeneously mix with the emulsified material. From the steady state to the demulsification state, the surfaces of the solutes in the slurry absorb the large amounts of the solvents owing to high specific surface area. After the step 2, the aggregate possesses high volume and has great capability of absorbing solvent. In other words, the agglomerate is a high-viscosity mixture that homogeneously absorbs a large amount of liquid.

In the present invention, there is no pore-forming agent in the materials for making the porous structure electrode. Furthermore, there is no pore-forming agent in the first slurry, and there is no pore-forming agent in the second slurry as well.

If a pore-forming agent is added, part of it will remain in the porous structure electrode, which changes the characteristics of the surface structure of the porous structure electrode. In addition to reducing the surface hydrophobicity, the remaining pore-forming agent will also affect the internal conduction path, thus resulting in increased resistance and weak electrochemical characteristics.

In the Step 3, the film material is obtained by performing the film forming process on the aggregate. The film forming process can be achieved by using a roller machine, such as a mixing mill or a calender. After the film forming process, the aggregate is formed into a film material. Next in the Step 4, the film material is heated to the first temperature. In one example, the first temperature is in a range between 25° C. and 200° C. The Steps 3 and 4 can be repeated at least once and a number of the cycles of the Steps 3 and 4 may be dependent on the required thickness of the electrode. That is, the number of the cycles may be increased if the electrode is desired to have a smaller thickness, while the number of the cycles may be decreased if the electrode is desired to have a greater thickness. In a non-limiting example, the Steps 3 to 4 can be repeated 1 to 20 times.

In the Step 6, when the film material reaches the required thickness, the film material is then heated to the second temperature, the second temperature is in a range between 200° C. and 500° C. The purpose of heating to the second temperature is to remove the liquid from the film material and solidify the film material. The vaporization or evaporation of the liquids forms pores in the film material.

In the present invention, by adopting the carbon nanotube material and the carbon black material with high specific surface area, the liquid absorbency (or the capability or the amount of solvent adsorption) of the first slurry and the second slurry are greater than 50 wt. %. And after the Step 3, the liquid content in the second slurry may be reduced by 10 wt. % to 25 wt. %.

Various experimental examples (E-1 to E-2) are provided below to illustrate certain aspects of the present invention, so that those skilled in the art can better understand the present invention. The following experimental examples are only for helping understanding of the present invention, and the present invention is not limited by the following experimental examples. In another aspect, a porous structure electrode prepared by different materials is also described below as comparative examples (C-1 to C-4).

In the experimental examples and the comparative examples, the catalytic material is manganese dioxide ($MnO_2$), the carbon black material is Vulcan XC72R, the material with the hydrophilic group is an organic solvent of ethyl alcohol, and the emulsified material is a water-soluble PTFE emulsion. The comparative examples differ from the experimental examples in that there are no carbon nanotube materials in the comparative examples. Furthermore, PS balls are added in the comparative example 3 as a pore-forming agent, while the nanocarbon fibers VGCF-H are added in the comparative example 4. The detailed components of the experimental examples and the comparative examples are listed in Table 1. In the experimental example 1, the weight percentage of the catalytic material (i.e. the sum of the catalyst and the solvent) relative to the first slurry is 74 wt. %, and the weight percentage of the carbon nanotube material relative to the first slurry is 0.9 wt. %, the weight percentage of the material with the hydrophilic group relative to the first slurry is 12.5 wt. %, the weight percentage of the carbon black material relative to the first slurry is 12.5 wt. %, and the weight percentage of the emulsified material relative to the second slurry is 11 wt. %. In the experimental example 2, the weight percentage of the catalytic material (i.e. the sum of the catalyst and the solvent) relative to the first slurry is 73.3 wt. %, the weight percentage of the carbon nanotube material relative to the first slurry is 1.9 wt. %, the weight percentage of the material with the hydrophilic group relative to the first slurry is 12.4 wt. %, the weight percentage of the carbon black material relative to the first slurry is 12.4 wt. %, and the weight percentage of the emulsified material relative to the second slurry is 11 wt. %.

To determine the water content and dehydration of each step in the experimental examples and the comparative examples, the weight measurements are carried out. Moreover, the current density test and the waterproof and air permeability test are also carried out for each experimental example and comparative example.

Figure 2:
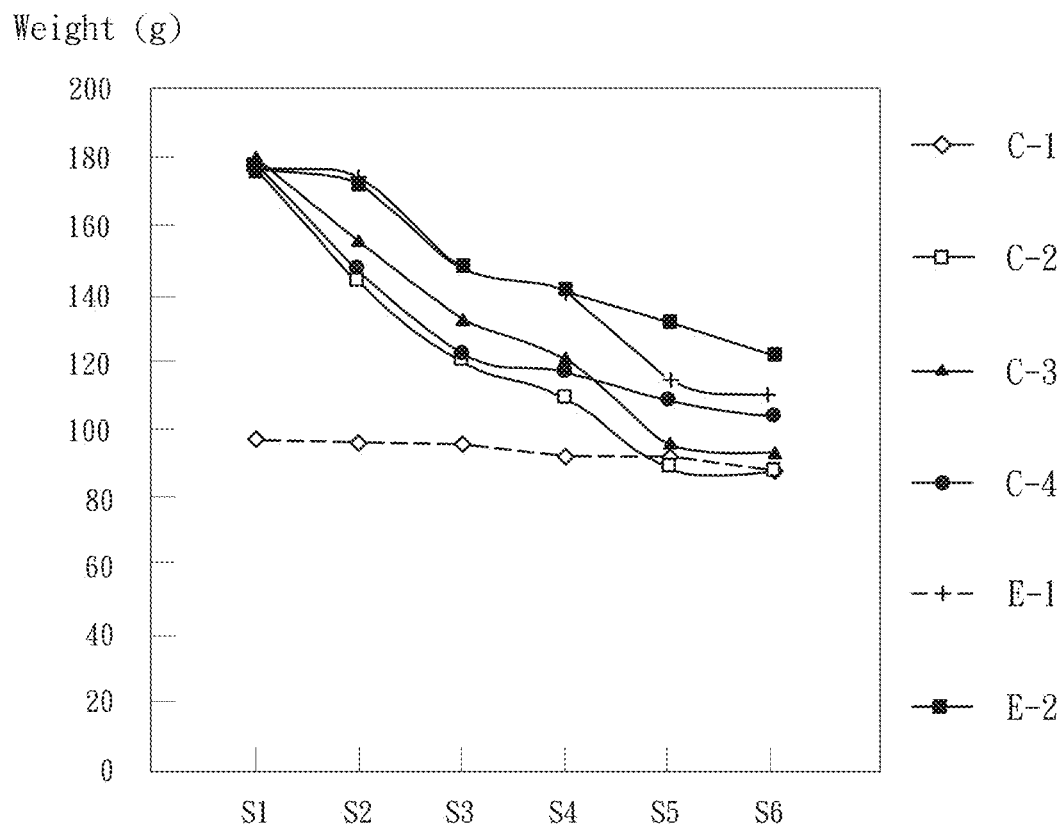
FIG. 2 shows the weight changes of each step in the experimental examples and the comparative examples.

FIG. 2 shows the weight changes of each step in the experimental examples and the comparative examples. From FIG. 2, it can be seen that the water content of the comparative example 1 has almost no change, while the water content of the comparative example 2 to comparative example 4 after each step is greater than that of the experimental Example 1 and the experimental example 2. In other words, the experimental example 1 and the experimental example 2 have a higher water retention, that is, a higher content of solvent is absorbed in the slurry of the experimental example 1 and the experimental example 2, so that after the subsequent baking process, more pores can be introduced in the experimental example 1 and the experimental example 2.

In the current density test, the porous structure electrodes of each experimental example and comparative example are disposed on the nickel-foam cathode (negative electrode) of the electrochemical cell, and iridium dioxide ($IrO_2$) is used as the anode (positive electrode) of the electrochemical cell, the electrolyte is potassium hydroxide (KOH) solution, and the measured bulk resistance and current density are shown in Table 2. The results show that the bulk resistance and current density of the experimental example 1 and the experimental example 2 are better than those of the comparative example 1 to the comparative example 4.

Figure 3:
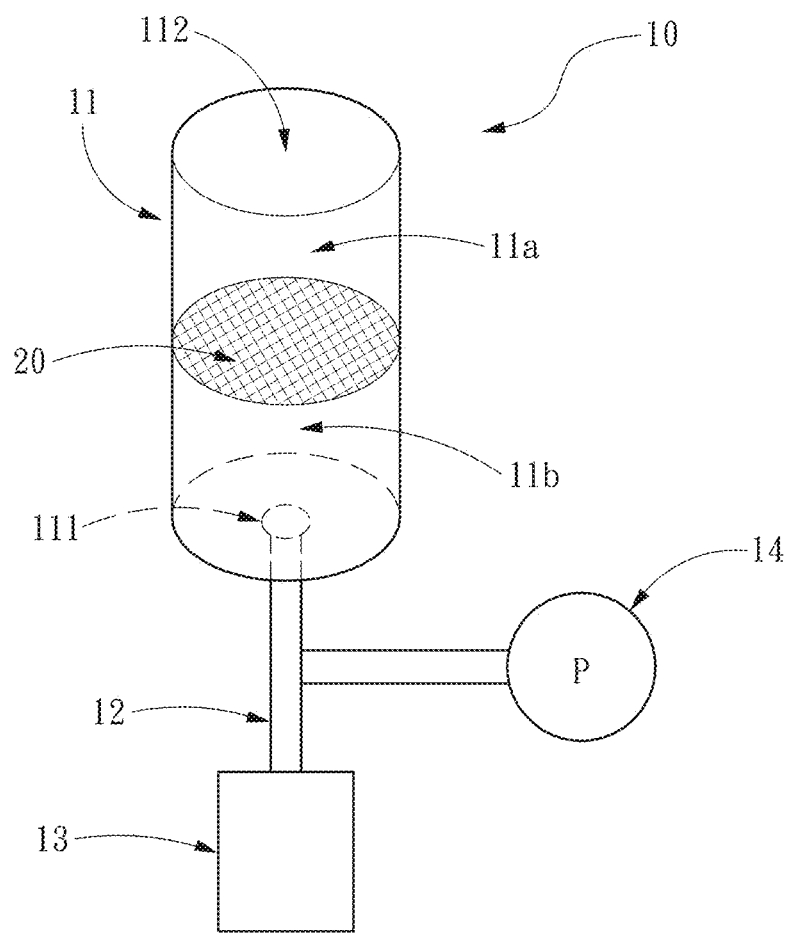
FIG. 3 is a schematic diagram of the device used to test the waterproof and gas permeability of each experimental example and comparative example.

FIG. 3 is a schematic diagram of the device used to test the waterproof and gas permeability of each experimental example and comparative example. The device 10 includes a chamber 11, a connecting duct 12, a gas supply 13 and a barometer 14. The chamber 11 is formed in a cylindrical shape and includes an upper half space 11a and a lower half space 11b. The porous structure electrodes 20 of the experimental examples and the comparative examples are placed between the upper half space 11a and the lower half space 11b. The chamber 11 has a bottom opening 111 connecting to the gas supply 13 through the connecting duct 12. During measurement, the gas supply 13 provides a gas stream to the lower half space 11b, the barometer 14 is connected with the connecting duct 12 to determine the pressure of the gas stream, and water is poured into the upper half space 11a. Water and gas will be entered into the space above and below the porous structure electrode 20 respectively, so as to simulate the environment when the porous structure electrode 20 is used as an electrode of an electrochemical cell or a gas sensor. The gas permeability and liquid impermeability of the porous structure electrode 20 can be known by observing whether water and gas penetrate the porous structure electrode 20.

For each of the experimental examples and the comparative examples, the liquid neither penetrates nor leaks through the porous structure electrode 20 from the upper half space 11a to the lower half space 11b, which means the porous structure electrode 20 has good liquid impermeability. For gas permeability, the results are listed in Table 2. In the experimental examples 1 and 2, bubbles started to appear and be observed (viewed from a top window 112 of the chamber 11) when the gas pressure is less than about 0.5 KPa.

Figure 4A:
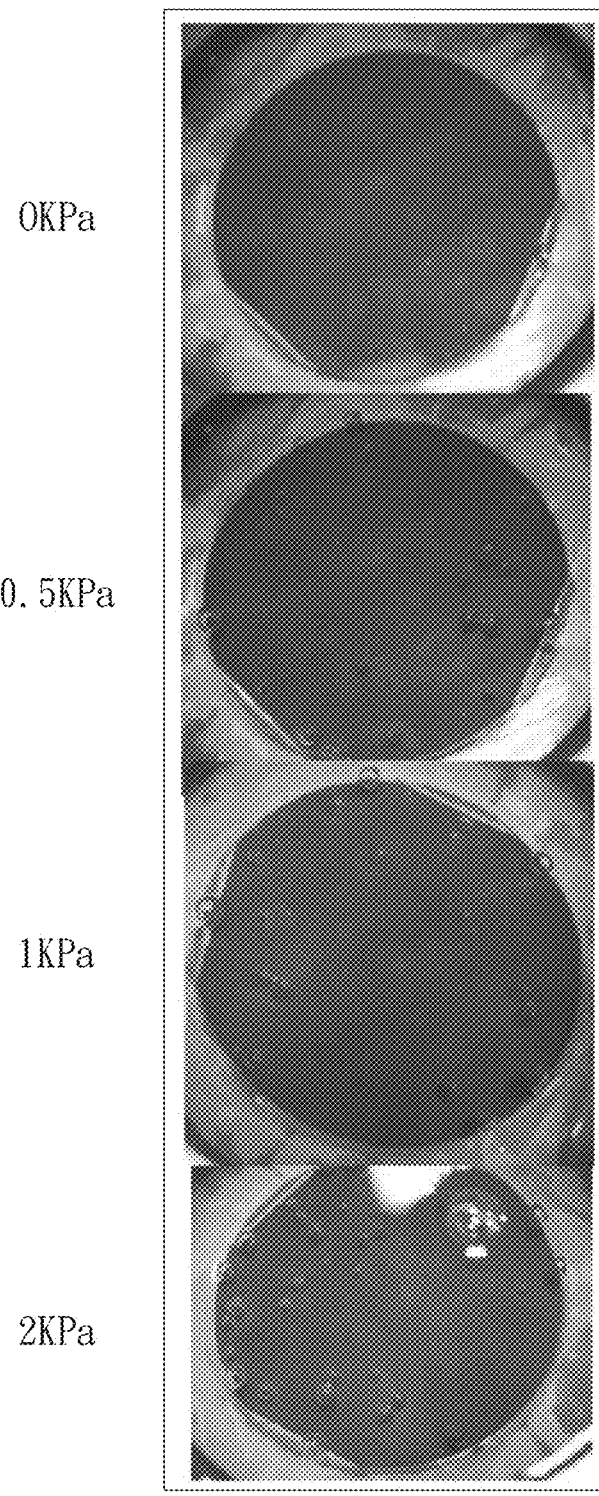
FIGS. 4A to 4C are top view photos of the experimental example 1.
Figure 4B:
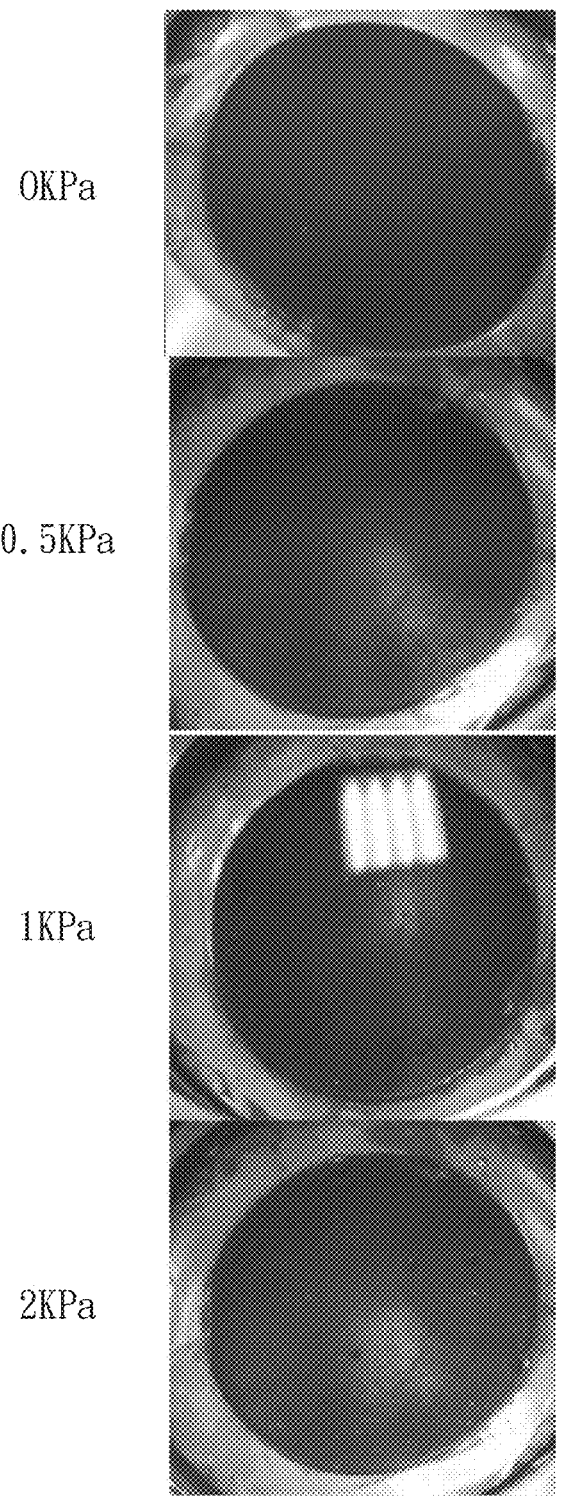
Figure 4C:
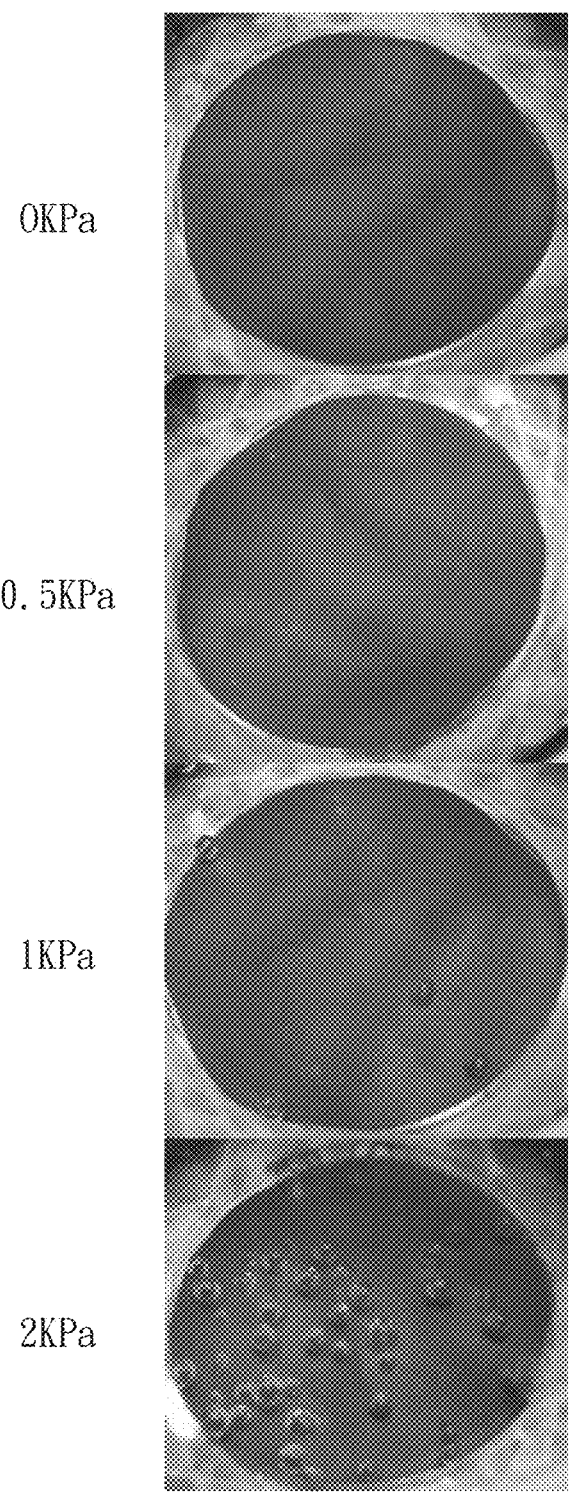

FIGS. 4A to 4C are top view photos of the experimental example 1, the comparative examples 2 and 4 showing the surface bubbles on the water in the upper half space 11a under different gas pressures. In the comparative example 1, the bubbles are observed when the gas pressure is about 4 KPa. In the comparatives example 2 and 4, the bubbles are observed when the gas pressure is about 1 KPa to 2 KPa. For the comparative example 3, cracks and ruptures occur in the porous structure electrode 20 when the gas pressure increased.

In addition, the viscosity measurements are carried out on the experimental examples 1 and 2. The viscosity of the experimental examples 1 and 2 are 15500 cP and 18750 cP, respectively.

In summary, the porous structure electrode obtained by the method of the present invention has excellent gas permeability and liquid impermeability, and also has good electrical current density.

TABLE 1

| | | (Unit: g) | | | | | |
| --- | --- | --- | --- | --- | --- | --- | --- |
| | | E-1 | E-2 | C-1 | C-2 | C-3 | C-4 |
| catalyst | $MnO_2$ | 44.57 | 44.2 | 81.63 | 44.94 | 44.57 | 43.84 |
| solvent | water | 612.81 | 607.73 | 306.13 | 617.98 | 612.81 | 602.73 |
| carbon nanotube material | CNT | 8.36 | 16.57 | — | — | — | — |
| carbon black material | Vulcan XC72R | 111.42 | 110.5 | 204.08 | 112.36 | 111.42 | 109.59 |
| material with hydrophilic group | ethyl alcohol | 111.42 | 110.5 | 204.08 | 112.36 | 111.42 | 109.59 |
| nanocarbon fibers | VGCF-H | — | — | — | — | — | 24.66 |
| pore-forming agent | PS ball | — | — | — | — | 8.36 | — |
| emulsified material | PTFE | 66.85 | 66.3 | 122.45 | 67.42 | 66.85 | 65.75 |
| | solvent (water) | 44.57 | 44.2 | 81.63 | 44.94 | 44.57 | 43.84 |

TABLE 2

| | E-1 | E-2 | C-1 | C-2 | C-3 | C-4 |
| --- | --- | --- | --- | --- | --- | --- |
| bulk resistance (Ohm-cm) | 0.368 | 0.403 | 0.408 | 0.498 | 0.58 | 0.2595 |
| current density (mA/cm$^2$) | 54.42 | 57.6 | 25.542 | 32.29 | 13.833 | 35.917 |
| Pressure in permeability test (KPa) | ≤0.5 | ≤0.5 | 4 | 2 | N/A | 1~2 |

What is claimed is:

1. A method for manufacturing a porous structure electrode with gas permeability and liquid impermeability, comprising the following steps:

step 1: mixing a catalytic material having hydrophilicity, a carbon nanotube material, a material with a hydrophilic group, and a carbon black material to form a first slurry, and stirring the first slurry, wherein the carbon nanotube material has a specific surface area equal to or greater than the carbon black material;

step 2: mixing the first slurry with an emulsified material to form a second slurry, and stirring the second slurry;

step 3: obtaining a film material from the second slurry through a film forming process;

step 4: heating the film material to a first temperature to remove solvent in the film material;

step 5: repeating steps 3 to 4 at least once; and step 6: heating the film material to a second temperature to remove liquid in the film material, thereby leaving pores in the film material, and allowing the film material to solidify, wherein the second temperature is higher than the first temperature, and the second temperature is between 200° C. and 500° C.;

wherein a weight percentage of the catalytic material in the first slurry is in a range of 50% to 85%, a weight percentage of the carbon nanotube material in the first slurry is in a range of 0.01% to 10%, a weight percentage of the material with the hydrophilic group in the first slurry is in a range of 7% to 30%, a weight percentage of the carbon black material in the first slurry is in a range of 5% to 30%, and a weight percentage of the emulsified material in the second slurry is in a range of 2% to 20%.

2. The method of claim 1, wherein the catalytic material is a mixture of a catalyst and water, and the catalyst is selected from the group consisting of carbon-supported platinum (Pt/C), platinum (Pt), gold (Au), silver (Ag), iridium dioxide ($IrO_2$), ruthenium dioxide ($RuO_2$), lanthanum nickel oxide ($LaNiO_3$), lanthanum cobalt oxide ($LaCoO_3$), cobalt monoxide (CoO), tricobalt tetroxide ($Co_3O_4$), manganese dioxide ($MnO_2$), nickel hydroxide ($Ni(OH)_2$), ferric oxide ($Fe_2O_3$) and combinations thereof.

3. The method of claim 1, wherein, the material with the hydrophilic group is an alcohol solvent or a ketone solvent, and the alcohol solvent is selected from the group consisting of methyl alcohol, ethyl alcohol, ethylene glycol, diethylene glycol, polyethylene glycol, propylene glycol, glycerol, n-propanol, isopropyl alcohol, diacetone alcohol, n-butyl alcohol, isobutyl alcohol, pentaerythritol and combinations thereof, and the ketone solvent is selected from the group consisting of acetone, methyl ethyl ketone, diisobutyl ketone, n-methylpyrrolidone, isophorone and combinations thereof.

4. The method of claim 1, wherein the emulsified material is selected from the group consisting of polytetrafluoroethylene emulsion, polyvinylidene fluoride emulsion, polytrifluoroethylene emulsion, fluorinated ethylene and hexafluoropropylene copolymer emulsion, perfluoroalkoxyalkane emulsion, ethylene tetrafluoroethylene emulsion, polyurethane emulsion, polypropylene emulsion, polycarbonate emulsion, polystyrene emulsion, polymethyl methacrylate emulsion, polyamide emulsion, ethylene vinyl acetate emulsion, polyvinyl acetate emulsion, polysilicone emulsion, fluoro vinyl methyl siloxane (FVMQ), styrene emulsion, polybutadiene emulsion, polyvinylchloride emulsion, styrene butadiene styrene emulsion, acrylonitrile butadiene styrene emulsion, styrene butadiene rubber emulsion and combinations thereof.

5. The method of claim 1, wherein the first temperature is in a range between 25° C. and 200° C.

6. The method of claim 1, wherein the first slurry does not include a pore-forming agent.

7. The method of claim 1, wherein a water content of the first slurry and the second slurry is greater than 50 wt. %.

8. The method of claim 1, wherein after the step 3, a water content of the second slurry is reduced by 10 wt. % to 25 wt. %.

* * * * *